March 26, 1946.  H. J. WILHOYTE, JR  2,397,227
SCRAPE-ABRASION TESTING MACHINE
Filed March 29, 1945  2 Sheets-Sheet 1

WITNESSES:  INVENTOR
Howard J. Wilhoyte, Jr.
BY
ATTORNEY

March 26, 1946. H. J. WILHOYTE, JR 2,397,227
SCRAPE-ABRASION TESTING MACHINE
Filed March 29, 1945 2 Sheets-Sheet 2
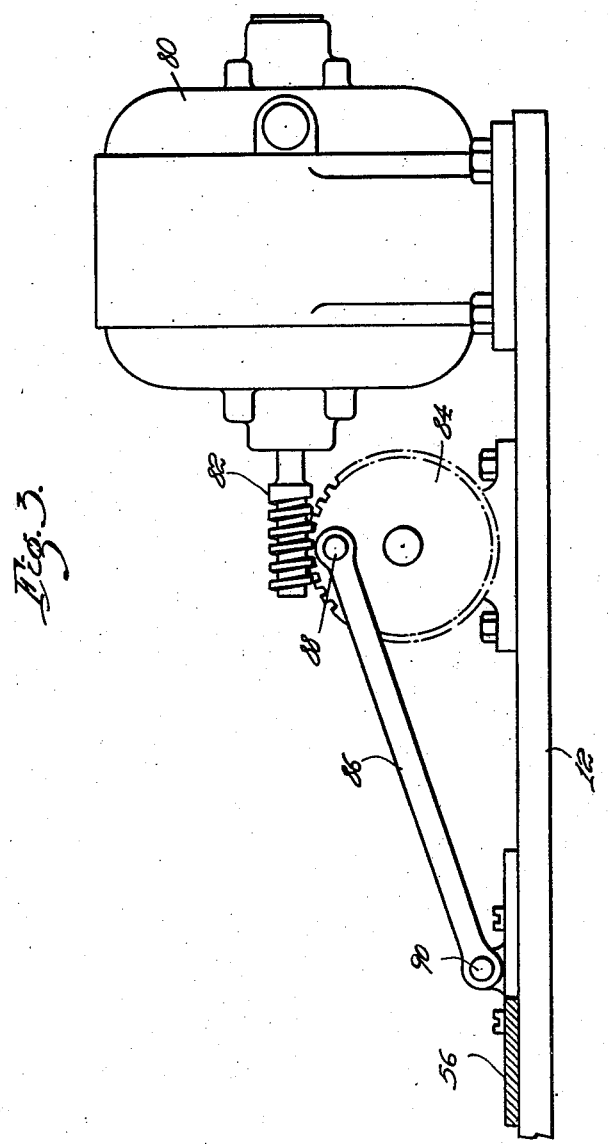
WITNESSES:
INVENTOR
Howard J. Wilhoyte, Jr.
BY
ATTORNEY Patented Mar. 26, 1946

2,397,227

UNITED STATES PATENT OFFICE 2,397,227

SCRAPE-ABRASION TESTING MACHINE

Howard J. Wilhoyte, Jr., Wilkinsburg, Pa., assignor to Westinghouse Electric Corporation, East Pittsburgh, Pa., a corporation of Pennsylvania Application March 29, 1945, Serial No. 585,407

5 Claims. (Cl. 73—7)

This invention relates to testing machines and, more particularly, machines for evaluating the relative merit of insulating enamel coatings on wire.

Many mechanical tests have been proposed and applied to insulated wire in order to determine the relative merits of the applied insulating coatings thereon. The tests in many cases determine essentially a single physical property. Obviously, only one test will not give sufficient information about all the pertinent properties of a coating. For example, the scrape test for enameled wire is commonly employed in the trade. The scrape test is carried out by applying to an enameled wire a knife edge carrying a predetermined load. The enameled wire is pulled under the knife edge and the load is increased for each successive sample of the enameled wire being tested until the applied load is sufficient to cause the knife edge to scrape off some of the enamel. The maximum load which can be applied before the coating fails is designated as the scrape value of that enamel coating.

Analysis of the scrape test indicates that it is a measure of a limited set of physical properties of the wire enamel. However, both low scrape values and extremely high scrape values have often been found to indicate undesirable enamel coatings. A low scrape value wire enamel coating is obviously too soft and fails readily in use when subjected to a load. On the other hand, an extremely high scrape value enamel coating frequently is one that tends to be brittle and fails readily on flexing or elongation of the wire. Therefore scrape values of wire enamel coatings are not absolutely dependable criteria of such coatings.

In order to evaluate fully and properly enamel coatings or other insulative coatings for wire, a great number of different tests, each determining essentially a single property, are considered necessary at the present time. Furthermore, unless carefully interpreted, the tests have been found to be misleading. While some tests indicate that a given enamel coating is apparently better than other enamel coatings, yet in practice wire coated with the given enamel has proven inferior to other enamels showing up less favorably on test.

In many cases, any given test of enamel coatings is not of universal application and test values often must be carefully qualified before they can be regarded as significant or comparable to the same test values on other materials. It has been long regarded as desirable to be able to subject an insulating wire to a single test which would give an indication of the relative merit of the physical properties of the insulative coating on that wire corresponding to the actual results obtained under service conditions.

The object of this invention is to provide a device for testing insulated wire that will give an indication of the relative merit for service applications of such insulated wire.

A further object of this invention is to provide a process whereby the physical characteristics of an insulating coating on a wire are correlated with the results obtained under service conditions.

Other objects of the invention will, in part, be obvious and will, in part, appear hereinafter.

For a fuller understanding of the nature and objects of the invention, reference should be had to the following detailed description and drawings, in which;

Fig. 3 is a view in elevation of a power drive for the apparatus of Figure 1.

It has been discovered that the relative merits of insulative coatings on wire may be determined by means of what I designate as a scrape-abrasion test. This test may be carried out manually or by means of the mechanism to be described herein. Briefly, the test comprises crossing a wire upon the insulated wire being tested, with a predetermined load being maintained between the wires and the wires being subject to flexing, and moving the wires relative to one another in such a manner that different portions of both wires are being continually and simultaneously subjected to rubbing and flexing forces. The two wires are reciprocated back and forth with respect to each other until the insulated coating fails. The number of strokes required to cause failure of the insulative coating is taken as the scrape-abrasion value.

Remarkable correlation between the values obtained by this test and the actual service results have been found in practice. No test is known that provides so close a correlation between test and actual service results. Furthermore, the test has been found to be suitable for not only enameled wire but wire insulated with paper, cotton, asbestos, glass fibers, and the like, with or without resinous materials thereon. The scrape-abrasion test of this invention appears to have more universal application to various types of insulating coatings than any test known heretofore.

Figure 1:
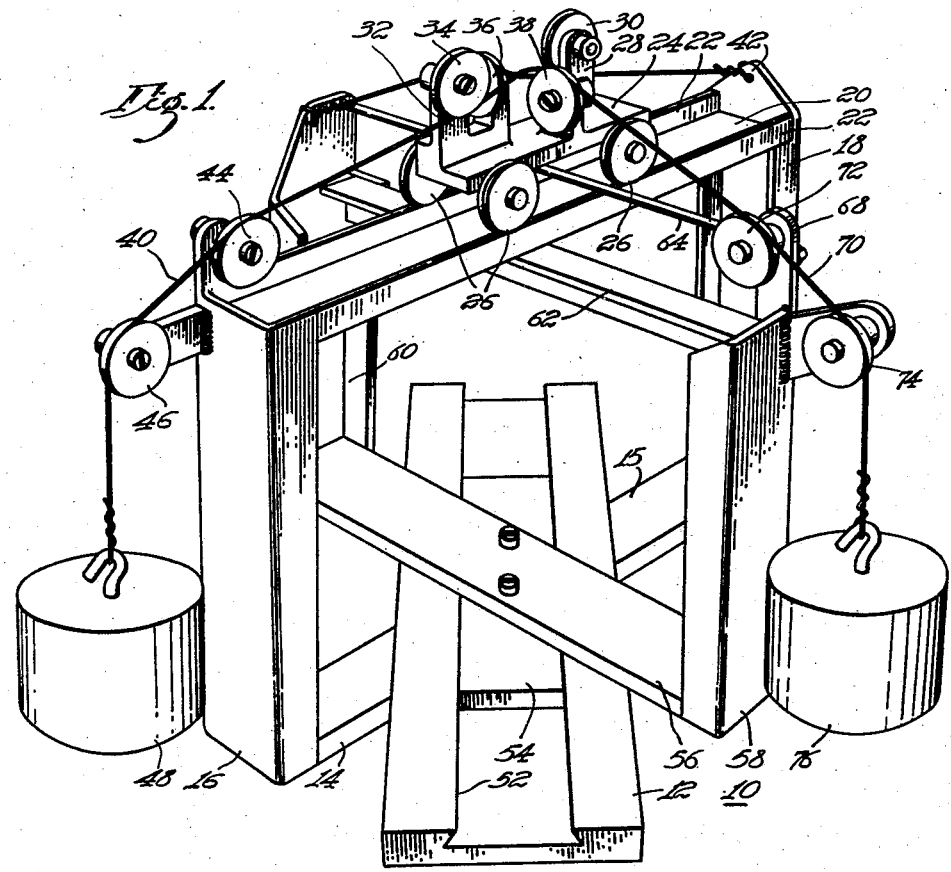
Figure 1 is a perspective view of a device embodying the invention.

Referring to Fig. 1 of the drawings, there is illustrated a testing device 10 which has been found highly convenient for making the scrape abrasion tests. The device consists of a relatively stationary base member 12 provided with angularly extending arms 14 and 15 to which are fastened vertical supports 16 and 18, respectively. The upper ends of the vertical supports 16 and 18 carry a guide means 20 provided with a pair of tracks 22. Mounted on the guide means 20 is a carriage 24 provided with wheels 26 for engaging the tracks 22 for reciprocating movement. The carriage has a vertical projection 28 carrying a rotatable pulley 30 and a second vertical projection 32 carrying a second rotatable pulley 34 aligned with the first pulley 30. Two pulleys 36 and 38 aligned at substantially a right angle to the first pair of pulleys 30 and 34 are likewise carried by the respective vertical projections 28 and 32. A horizontal line through the grooves at the top of pulleys 36—38 are about one-quarter inch higher than a horizontal line through the grooves at the bottom of pulleys 30—34. Accordingly, two crossed wires disposed in the grooves of each set of pulleys are each flexed one-eighth of an inch in the space between the pulleys due to this offset. A sample of insulated wire 40 is attached to a fastening element 42 carried by the upright 18 and is guided in contact with the pulleys 30 and 34 to stationary rotatable guide pulleys 44 and 46. A weight 48 is adapted to be fastened to the free end of the wire 40.

The base member 12 is provided with a linear guideway consisting of a slot 52 in which a relatively slidable member 54 may be reciprocated. Fastened at an angle to the slidable member 54 is a bar 56 carrying at its ends the upright members 58 and 60 tied together at their upper ends by a cross bar 62. A rod 64 is mounted in the upper end of upright 60 and in a lug 66 at the upper end of upright 58. The rod 64 passes loosely through a bushing (not shown) in the carriage 24 to move the carriage along the tracks 22 as well as to keep the carriage on the tracks 22 while permitting relative reciprocating movement. A wire 70 which may be an insulated wire or in some cases a bare copper wire or the like, is fastened to the upper end of upright 60, guided over the pulleys 36 and 38, and passes over rotatable guide pulleys 72 and 74. A predetermined load is applied to the free end of wire 70 by the weight 76.

The two wires 70 and 40 are substantially perpendicular to one another. The section of wire between pulleys 30—34 and 36—38 are about 2½ inches long and each wire is flexed one-eighth of an inch in this length. It will be apparent that the linear guideway 52 is disposed at such an angle to both the carriage guideway 20 and the respective wire aligning means as to accomplish this.

In carrying out the scrape abrasion test with the device 10, the sample of insulated wire 40 is fastened to the fastening element 42, threaded through pulleys 30 and 34, and the weight 48 is applied thereto as shown in Fig. 1. The wire 70 which may be, and preferably is, an identical sample of insulated wire, is fastened to the upright 60, threaded through pulleys 36 and 38 and the other end is attached to the weight 76. The slide 54 may be manually reciprocated. Suitable stops may be provided to insure that a constant length reciprocating stroke is maintained. When the slide 54 is so reciprocated, the carriage 24 travels from one end to the other of the guide 20. This causes the wires 40 and 70 to scrape or rub against one another at constantly changing portions of both wires. A significant amount of flexing of the wires occurs during the test. The number of strokes or cycles required to abrade an insulating coating on wire 40 is taken as a scrape abrasion value of such coating.

While the device has been shown and described with the wires 40 and 70 being at substantial right angles to one another, it will be apparent that any other suitable angle may be chosen.

Instead of weights 48 and 76 it is feasible to employ other tensioning means such, for example, as a spring device capable of adjustment for securing a predetermined load on the end of the wire under test. The loads at the ends of both wires 40 and 70 should be substantially the same.

It has been found desirable to vary the load to be applied to the wires being tested in accordance with their size. For example, size 12 wire is preferably tested with a six pound load while No. 32 wire is tested with a 12 ounce load. This variation in load with wire size is not extremely critical but facilitates the making of rapid and accurate tests.

Referring to Fig. 3 of the drawings, there is illustrated a motor drive for the testing device. An electric motor 80 is mounted on an extension of the base member 12. The motor 80 drives a worm 82 engaging a worm gear 84 so arranged that some convenient speed such as 35 revolutions per minute of the gear 84 are secured. The connecting rod is journaled at 88 to the gear and is journaled at the pitman bearing 90 attached to the angle bar 56.

It will be apparent that the motor 80 can be started and stopped by manual means alone. An automatic means operating by means of an electrical relay to stop the motor when the insulation on the wire has failed may be employed.

Figure 2:
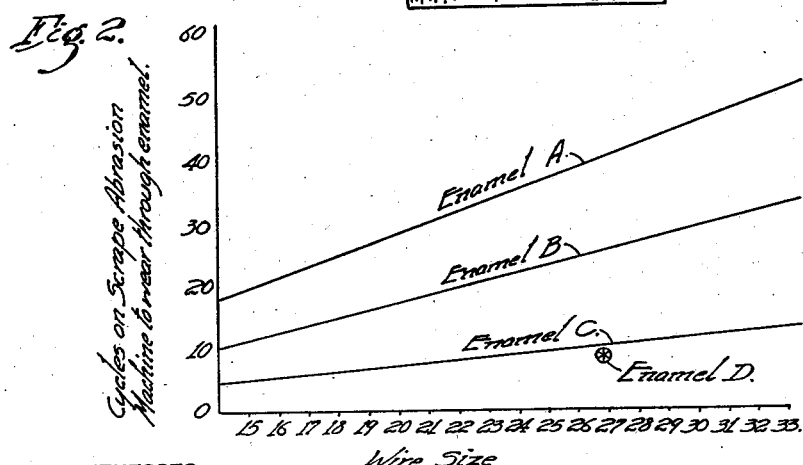
Fig. 2 is a graph plotting typical results obtained with the testing device.

Referring to Fig. 2 of the drawings, there is plotted the tests obtained with wire coated with four different enamels designated as A, B, C and D. It will be apparent that the tests indicate that enamel A is superior throughout the range of the wire sizes to all the other enamels. Enamel B gave coatings slightly inferior to those obtained with enamel A but superior to enamel C. Coatings of enamel C on winding abuse were inferior to both A and B, but slightly superior to those composed of a coating of enamel D on wires. The rating of enamel D is particularly significant since a standard abrasion test of this enamel by a rotating wheel abrasion tester well known in the art indicated it to be far superior to other known coatings. However, actual shop experience indicated it to be somewhat inferior to enamels A, B and C. These differences in the enamels shown by the test results have been confirmed by actual use of the same wires in building motors, magnet coils and other electrical apparatus. The relative merit of the enamels likewise is very closely proportional to the relative spacing between the curves. No other single test known has given results so closely correlated with actual service findings.

Since certain changes in carrying out the above processes and certain modifications in the apparatus which embodies the invention may be made without departing from its scope, it is intended that all the matter contained in the above description or shown in the accompanying drawings shall be interpreted as illustrative and not in a limiting sense.

I claim as my invention:

1. A device for testing insulated wire comprising, in combination, a base member provided with a first linear guide means, a second guide means attached to the base member disposed at an angle to the first linear guide means, a carriage mounted for reciprocatory movement on the second guide means, means for maintaining a sample of insulated wire in alignment with the second guide means, including portions of the carriage, a relatively slidable member mounted in the first linear guide means for reciprocatory movement, and means on the relatively slidable member for maintaining a second sample of wire in abrading contact with and at an angle to the first sample of insulated wire.

2. A device for testing insulated wire comprising, in combination, a base member provided with a first linear guide means, a second guide means attached to the base member and disposed at an angle to the first linear guide means, a carriage mounted for reciprocating movement on the second guide means, means on the carriage for guiding two samples of wire at substantially a right angle to each other, means on the base member for maintaining one of the samples of wire in substantial alignment with the second guide means, a relatively slidable member mounted on the first linear guide means for reciprocating movement, and means on the relatively slidable member for maintaining the second sample of wire in abrading contact with and in the position substantially perpendicular to the first wire.

3. A device for testing insulated wire comprising, in combination, a base member provided with a first linear guide means, a second guide means attached to the base member and disposed at an angle to the first linear guide means, a carriage mounted for reciprocating movement on the second guide means, two pairs of pulleys on the carriage for guiding two samples of the wire at substantially a right angle to each other, means including pulleys and a fastening alignment projection on the base member for maintaining one of the samples of wire in substantial alignment with the second guide means, a relatively slidable member mounted on the first linear guide means for reciprocating movement, means on the relatively slidable member, including other pulleys and a fastening element for maintaining the second sample of wire in abrading contact with and in a flexed position substantially perpendicular to the first wire, and means for applying a predetermined load to one end of each of the samples of insulated wire.

4. The method of testing enameled wire in order to evaluate the practical merit of the enamel coating thereon which comprises, applying one length of enameled wire at an angle to the enameled wire being tested with a predetermined constant load at the point of contact, maintaining the wires in a flexed state about the point of contact, moving the applied wire a predetermined distance both longitudinally with respect to the enameled wire being tested and laterally whereby the points under load are continually varying and repeating the movement until the enamel has been worn through, the number of strokes to wear through the insulation constituting the relative merit of the enamel insulation on the wire.

5. The method of testing insulated wire in order to evaluate the relative merit of the insulation thereon which comprises crossing two lengths of the insulated wire under predetermined constant load, the wires being under predetermined flexion and load at the point of contact, moving the wires with respect to one another a predetermined distance so that different portions of both wires cross and are subjected to abrasion and repeating the movement until the insulation on one wire is worn through, the number of strokes to wear through the insulation constituting the relative merit of the insulation on the wire.

HOWARD J. WILHOYTE, Jr.